United States Patent
Han et al.

(10) Patent No.: US 7,682,556 B2
(45) Date of Patent: Mar. 23, 2010

(54) DEGASSING OF MOLTEN ALLOYS WITH THE ASSISTANCE OF ULTRASONIC VIBRATION

(75) Inventors: Qingyou Han, Knoxville, TN (US);
Hanbing Xu, Knoxville, TN (US);
Thomas T. Meek, Knoxville, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 643 days.

(21) Appl. No.: 11/204,893

(22) Filed: Aug. 16, 2005

(65) Prior Publication Data
US 2007/0235159 A1  Oct. 11, 2007

(51) Int. Cl.
*C21C 5/48* (2006.01)
*B22D 41/58* (2006.01)
*B67D 7/00* (2010.01)
*B01D 19/00* (2006.01)
*C22B 9/00* (2006.01)

(52) U.S. Cl. .................... 266/218; 222/603; 96/175; 75/708

(58) Field of Classification Search ......... 266/215–226, 266/265–270, 200, 207–211; 96/155–220, 96/329, 332, 389, 6, 234, 371; 95/29, 30, 95/46, 151, 156–186, 241–266; 75/10.39–10.45, 75/10.64, 375–379, 405–412, 511, 512, 601, 75/602, 639, 648, 649, 680, 699, 708; 116/137 R, 116/138–141, 142 R, 143–146, 142 FP, 142 FV, 116/137 A
See application file for complete search history.

(56) References Cited

U.S. PATENT DOCUMENTS

| 2,800,444 | A | * | 7/1957 | Hughes et. al. | ........ 204/157.62 |
| 3,160,138 | A | * | 12/1964 | Platzman | ................ 116/137 R |
| 3,904,392 | A | | 9/1975 | VanIngen et al. | |

(Continued)

FOREIGN PATENT DOCUMENTS

EP  1264904 A1  12/2002

(Continued)

OTHER PUBLICATIONS

Patent Abstract for JP 2-173204, published Apr. 7, 1990.

(Continued)

*Primary Examiner*—Scott Kastler
*Assistant Examiner*—Vanessa Velasquez
(74) *Attorney, Agent, or Firm*—Quarles & Brady, LLP (57) ABSTRACT

An apparatus and method are disclosed in which ultrasonic vibration is used to assist the degassing of molten metals or metal alloys thereby reducing gas content in the molten metals or alloys. High-intensity ultrasonic vibration is applied to a radiator that creates cavitation bubbles, induces acoustic streaming in the melt, and breaks up purge gas (e.g., argon or nitrogen) which is intentionally introduced in a small amount into the melt in order to collect the cavitation bubbles and to make the cavitation bubbles survive in the melt. The molten metal or alloy in one version of the invention is an aluminum alloy. The ultrasonic vibrations create cavitation bubbles and break up the large purge gas bubbles into small bubbles and disperse the bubbles in the molten metal or alloy more uniformly, resulting in a fast and clean degassing.

10 Claims, 10 Drawing Sheets

U.S. PATENT DOCUMENTS

| | | | |
|---|---|---|---|
| 4,235,627 A * | 11/1980 | Dantzig et al. ............... 75/680 |
| 4,287,755 A | 9/1981 | Mansfield |
| 4,316,734 A | 2/1982 | Spinosa et al. |
| 4,373,950 A | 2/1983 | Shingu et al. |
| 4,564,059 A | 1/1986 | Dobatkin et al. |
| 4,662,215 A | 5/1987 | Eckert |
| 4,770,699 A | 9/1988 | Mountford |
| 4,772,319 A | 9/1988 | Otsuka et al. |
| 4,834,124 A | 5/1989 | Honda |
| 4,847,047 A | 7/1989 | Groetsch, Jr. et al. |
| 5,024,696 A | 6/1991 | Ryan |
| 5,186,389 A | 2/1993 | Shibano |
| 5,340,379 A | 8/1994 | Tremblay et al. |
| 5,468,429 A | 11/1995 | Li et al. |
| 5,616,167 A | 4/1997 | Eckert |
| 5,660,614 A | 8/1997 | Waite et al. |
| 5,803,106 A | 9/1998 | Cohen et al. |
| 5,803,948 A | 9/1998 | Sizov et al. |
| 5,935,295 A | 8/1999 | Megy |
| 5,994,818 A | 11/1999 | Abramov et al. |
| 6,217,632 B1 | 4/2001 | Megy |
| 6,230,799 B1 | 5/2001 | Slaughter et al. |
| 6,244,738 B1 | 6/2001 | Yasuda et al. |
| 6,375,712 B1 | 4/2002 | Forberg et al. |
| 6,402,367 B1 | 6/2002 | Lu et al. |
| 6,429,575 B1 | 8/2002 | Abramov et al. |
| 6,887,424 B2 | 5/2005 | Ohno et al. |
| 2002/0011321 A1 | 1/2002 | Aoyama et al. |
| 2003/0062144 A1 | 4/2003 | Aoyama et al. |
| 2004/0055726 A1 | 3/2004 | Hong et al. |

FOREIGN PATENT DOCUMENTS

GB    1227876    4/1971

OTHER PUBLICATIONS

Patent Abstract for JP 2-173205, published Apr. 7, 1990.

R. Sebus et al, Abstract of Optimisation of Coil-Design for Inductive Heating in the Semi-Solid State, pp. 481-487, (Jun. 23-25, 1998).

M.C. Flemings et al, Rheocasting, Materials Science and Engineering, 1976, pp. 103-117.

M.C. Flemings, Behavior of Metal Alloys in the Semisolid State, Metallurgical Transactions A, vol. 22A, May 1991, pp. 957-981.

D.H. Kirkwood, Semisolid metal processing, International Materials Reviews, vol. 39, No. 5, pp. 173-189, (1994).

Q. Han et al., Particle pushing: the concentration of particles near a solid interface during downward flow, Journal of Crystal Growth 140 (1994), pp. 398-405.

Q. Han et al., Redistribution of Particles during Solidifcation, ISIJ International, vol. 35 (1995), No. 6, pp. 693-699.

D.B. Spencer et al., Rhelogical Behavior of Sn-15 Pct Pb in the Crystallization Range, Metallurgical Transactions, vol. 3, Jul. 1972, pp. 1925-1932.

M. Garat et al., Abstract of Aluminium Semi-Solid Processing: From the Billet to the Finished Part, pp. xvii-xxxi, (1998).

Oleg V. Abramov, High-Intensity Ultrasonics Theory and Industrial Applications, Gordon and Breach Science Publishers, pp. 370 & 371, (1998).

G.I. Eskin, Ultrasonic Treatment of Light Alloy Melts, All-Russia Institute of Light Alloys, Gordon and Breach Science Publishers, Copyright 1998 OPA.

Advanced Casting Research Center (ACRC) Consortium Meeting presentation, Metal Processing Institute, May 15, 2001, 23 pgs.

John L. Jorstad, SLC, A Novel New & Economical Approach to Semi Solid Metal (SSM) Casting, J L J Technologies, Inc., pp. 1-15.

* cited by examiner

DEGASSING OF MOLTEN ALLOYS WITH THE ASSISTANCE OF ULTRASONIC VIBRATION

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

CROSS-REFERENCES TO RELATED APPLICATIONS

Not Applicable.

BACKGROUND OF THE INVENTION

1. Field of the Invention

This invention relates to a method and apparatus in which high-intensity ultrasonic vibration is applied to a radiator that creates cavitation bubbles, breaks up purge gas (e.g., argon or nitrogen) which is intentionally introduced in a small amount into the melt in order to collect the cavitation bubbles and to make the cavitation bubbles survive in the melt, and induces acoustic streaming to disperse the bubbles uniformly in the melt, resulting in a fast and clean degassing of the molten metal or molten metal alloy.

2. Description of the Related Art

Porosity is one of the major defects in the casting of aluminum alloys, magnesium alloys, and steels. The formation of porosity is due to a significant solubility difference of gaseous elements in the liquid and solid phases, and an inadequate feeding of the solidification shrinkage of the alloy. For example, in aluminum alloys, hydrogen solubility in molten alloy is much higher than that in the solid. As a result, hydrogen porosity forms during the solidification of aluminum castings. The presence of porosity can be detrimental to the mechanical properties and corrosion resistance of the castings. Molten aluminum and aluminum alloys also contain solid non-metallic inclusions (e.g. aluminum oxides, aluminum carbides) and various reactive elements (e.g. alkali and alkaline earth metals). Non-metallic solid inclusions reduce metal cleanliness and the reactive elements and inclusions may create unwanted metal properties.

Therefore, before many molten metals and alloys are used for casting, unwanted components that may adversely affect porosity or other physical or chemical properties of the resulting cast product are removed. These unwanted components are normally removed from molten metals by introducing a purge gas below the surface of the molten metal. As the resulting purge gas bubbles rise through the mass of molten metal, the gas bubbles adsorb gases (e.g., hydrogen) dissolved in the metal and remove them from the melt. In addition, non-metallic solid particles are swept to the surface by a flotation effect created by the bubbles and can be skimmed off. If the gas is reactive with contained metallic impurities, the elements may be converted to compounds by chemical reaction and removed from the melt in the same way as the solid particles. This process is often referred to as "metal degassing", i.e. reducing the gas content of a molten metal or metal alloy.

Several methods have been proposed for degassing molten metals and molten metal alloys. For example, U.S. Pat. No. 6,887,424 describes a process for inline degassing of a molten metal using a rotary device for generating bubbles of inert gas in the molten metal. U.S. Pat. Nos. 5,660,614 and 5,340,379 describe devices for injecting gas into molten aluminum. However, in these devices, degassing is a relatively slow process due to the large size of the bubbles that are produced. Other problems associated with these methods are the failure of moving graphite parts and the disturbance of the molten melt surface during rotary degassing, resulting in a significant oxide formation. Furthermore, the purging gas (usually argon) has to contain a few percent of chlorine in order make degassing efficient. Chlorine may be detrimental to the environment.

Molten metal degassing devices using ultrasonics have also been proposed. For example, Japanese patent application JP 2-173205 describes a dipping pipe of a degassing machine having an ultrasonic vibrator attached to the inner wall of the dipping pipe through which molten metal is drawn from a ladle into a vacuum tank. Japanese patent application JP 2-173204 describes a vacuum tank of a degassing machine having an ultrasonic vibrator attached to the bottom wall of the vacuum tank including dipping pipes for circulating molten metal. These methods utilize ultrasonics to assist vacuum degassing but vacuum degassing is seldom used in North America.

High-intensity ultrasonic vibration has been used to create cavitation bubbles for degassing molten metals. These methods can be used for degassing melts of small volume because hydrogen diffused to the cavitation bubble can diffuse back to the molten metal and a part of the cavitation bubbles can not survive for a longer time.

There is still a need for an improved apparatus and method for the degassing of molten metals or molten metal alloys and to eliminate the use of chlorine in the purging gas.

SUMMARY OF THE INVENTION

The foregoing needs are met by the present invention which provides an apparatus and method in which ultrasonic vibration is used to assist in the degassing of molten metals or metal alloys thereby reducing gas content in the molten metals or alloys. A small amount of purge gas is used to provide stable bubbles for degassing and high-intensity ultrasonic vibration is used to create tiny cavitation bubbles, breakup the large purging gas bubbles into much smaller bubbles, which collect the cavitation bubbles along their way to escape at the surface of the melt, and to disperse the bubbles uniformly in the melt.

In one aspect, the invention provides an apparatus for degassing a liquid such as a molten metal or a molten metal alloy. The apparatus includes an ultrasonic transducer and a radiator coupled to the ultrasonic transducer. Activation of the ultrasonic transducer creates ultrasonic vibration in the radiator. The ultrasonic transducer may be a piezoelectric transducer that generates ultrasonic waves having a frequency of about 1000 Hz to about 2,000,000 Hz in response to electrical stimuli.

The radiator has a hollow shell defining a fluid flow path for transporting a purge gas. The shell includes at least one throughhole that extends from the fluid flow path to an outer surface of the shell. The through holes can be anywhere on the shell of the radiator exposed to the liquid. In one example form, the shell of the radiator has an outer cylindrical wall and an end wall that extends inward from the outer wall, and a plurality of throughholes extend from the fluid flow path through the end wall to the outer surface of the radiator. The radiator may be positioned in a wall of a container holding the liquid such that the outer surface of the radiator can contact the liquid in the container. Purge gas (e.g., argon or nitrogen)

is transported through the radiator into the liquid (e.g., a molten metal or alloy such as an aluminum alloy) in the container (e.g., a refractory ladle, a crucible, a furnace, or in a reservoir in the trough transporting molten alloy). The ultrasonic vibrations of the radiator break up the large bubbles into small bubbles, as well as create cavitation bubbles and acoustic streaming in the melt. The acoustic streaming mixes the melt thoroughly, coalescing the cavitation bubbles with purge gas bubbles, and disperses the bubbles in the molten metal or alloy more uniformly, resulting in a fast and clean degassing. One of the purposes of using a small amount of purge gas is to make the ultrasonically induced cavitation bubbles survive in the melt such that the technology can be used for degassing of a large volume melt. For melt of small volume or of small liquid depth, no purge gas is needed since the cavitation bubbles can usually survive in the melt and escape from the melt surface. To induce cavitation bubbles, the intensity of the ultrasonic vibration should be high enough to create an instantaneous pressure on the order of a few MPa in the melt near the radiator. The cavitation threshold is about 1 MPa in molten aluminum. Cavitation is fully developed at 10 MPa, and pressure levels up to 100 MPa are possible.

Preferably, the radiator is positioned in the wall of the container such that the outer surface of the radiator is below liquid in the container. In this construction, the bubbles (cavitation bubbles or purge gas bubbles) rise through the mass of liquid, and the gas bubbles adsorb gases (e.g., hydrogen) dissolved in the liquid and remove them from the liquid. The container may include an inlet and an outlet for the liquid, and the outlet may be positioned above the inlet such that liquid having dissolved gas enters the inlet and degassed liquid exits the outlet at a higher level in the container.

A cooling jacket may be provided for surrounding the radiator for keeping the majority of the radiator at low temperatures by reducing heat transfer from the molten metal to the radiator. Also, in one form, the outer surface of the end wall of the radiator has a coating that resists bonding with the liquid in the container. Means for lowering air pressure above liquid in the container and/or means for regulating humidity above liquid in the container may be provided for enhanced degassing of the liquid.

In another aspect, the invention provides a method for degassing a liquid such as a molten metal or metal alloy. In the method, a radiator is coupled to an ultrasonic transducer. The radiator has a shell defining a fluid flow path for transporting a purge gas and the shell includes at least one throughhole that extends from the fluid flow path to an outer surface of the radiator. The liquid is contacted with the outer surface of the radiator, and the ultrasonic transducer is activated to create ultrasonic vibration in the radiator. Purge gas is then introduced into the liquid through the at least one throughhole in the radiator. Purge gas bubbles rise through the mass of liquid and are broken into smaller bubbles by the ultrasonic waves from the radiator. The purge gas bubbles adsorb cavitation bubbles and gases (e.g., hydrogen) dissolved in the liquid and remove them from the top of the liquid.

The method may be used with a container for the liquid. In this version of the method, the radiator is positioned in a wall of the container such that the outer surface of the radiator can contact liquid in the container. Preferably, the radiator is positioned in the wall of the container such that the outer surface of the radiator is below liquid in the container. As a result, the bubbles rise through the mass of liquid, and the gas bubbles adsorb gases (e.g., hydrogen) dissolved in the liquid and remove them from the liquid.

In one version of the method, a vacuum is created above the liquid in the container to enhance degassing. In another version of the method, humidity is regulated above the liquid in the container to enhance degassing.

In one specific application of the method, dissolved gases are removed from a molten metal or molten metal alloy in a container such as a refractory ladle, a refractory holding furnace, or any reservoir in the launder/trough of a molten metal transporting system. A radiator is coupled to an ultrasonic transducer. The radiator has a shell defining a fluid flow path for transporting a purge gas and the shell includes at least one throughhole that extends from the fluid flow path to an outer surface of the radiator. The outer surface of the radiator may have a coating that resists bonding with the molten metal or molten metal alloy in the container. Coatings that resist molten metal attack are suitable if they can be metallurgically bonded to the radiator. Example coatings include ceramic materials such as metal oxides, metal nitrides and metal carbides. The radiator is positioned in a wall of the container such that the outer surface of the radiator can contact the molten metal or molten metal alloy in the container. The ultrasonic transducer is activated to create ultrasonic vibration in the radiator, and a purge gas (e.g., argon or nitrogen) is introduced into the molten metal or molten metal alloy through the at least one throughhole. In one example application, the molten metal or molten metal alloy is selected from metals and metal alloys that are prone to porosity formation upon solidification from a melt. In another example application, the molten metal or molten metal alloy is selected from aluminum, aluminum alloys, magnesium, magnesium alloys, steels, or cast iron, and the dissolved gas is hydrogen in aluminum, aluminum alloys, magnesium, and magnesium alloys, and the dissolved gas is nitrogen or carbon containing gases in steels and cast irons.

These and other features, aspects, and advantages of the present invention will become better understood upon consideration of the following detailed description, drawings, and appended claims.

BRIEF DESCRIPTION OF THE DRAWINGS

Like reference numerals will be used to refer to like or similar parts from Figure to Figure in the following description of the drawings.

DETAILED DESCRIPTION OF THE INVENTION

The present invention is carried out by "ultrasonic degassing", which comprises vibrating a radiator at an ultrasonic frequency as a small amount of purge gas is introduced through the radiator into a molten material in order to facilitate the degassing of the molten material. The introduction of high-intensity ultrasonic vibration in the alloy melt generates an alternating pressure field within the alloy melt. This leads to the instantaneous variation in the local pressure from a minimum to a maximum at the ultrasonic vibration frequencies. The alternating pressure can be used to create tiny cavitation bubbles and acoustic streaming in the melt, and to break up bubbles produced by the purging gas. A small amount of purge gas (usually a fraction of what is used in the rotary degassing method) is introduced through the radiator to the melt in order to make the acoustically induced cavitation bubbles survive in the melt. In one embodiment, the purge gas is introduced through the radiator at a rate of 30 cubic feet per hour or less. The survival of the cavitation bubbles is achieved by collapsing the tiny cavitation bubbles into the purge gas bubbles.

Figure 1:
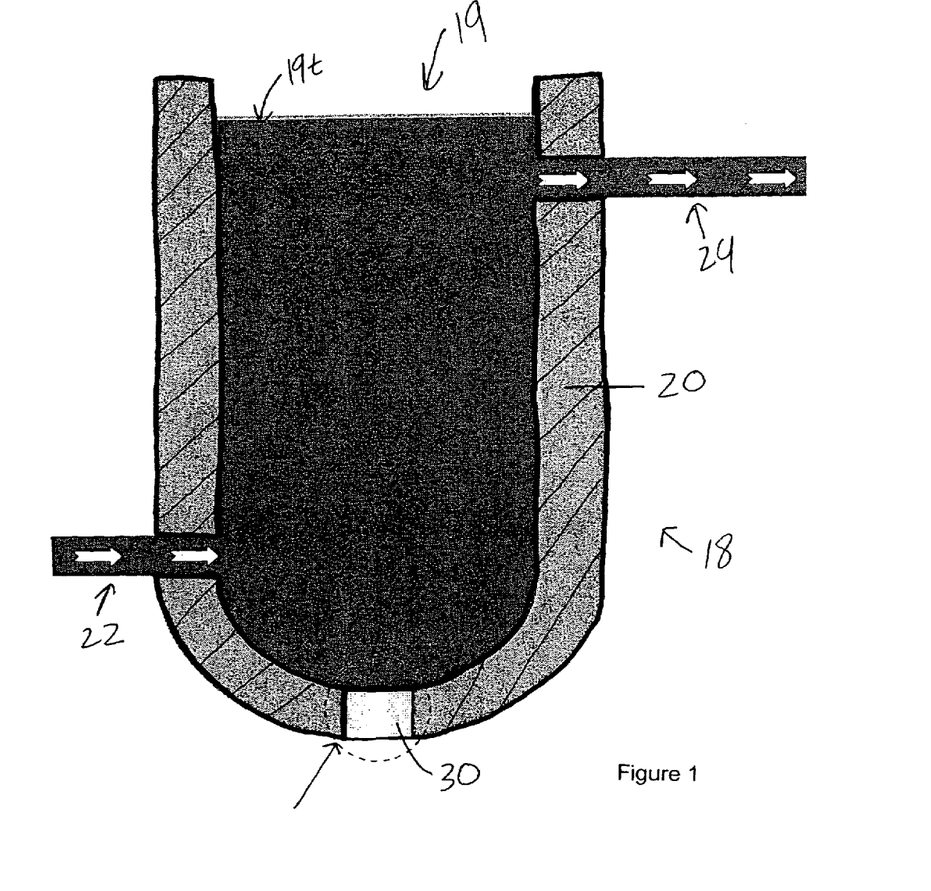
FIG. 1 is a cross-sectional view of a refractory ladle including an apparatus according to the invention.

FIG. 1 shows one example of an apparatus using ultrasonic vibration to speed up degassing of a melt. A refractory ladle 18 containing a molten metal or alloy melt 19 has an insulating outer wall 20 with a melt inlet 22 and a melt outlet 24. Molten metal or alloy melt 19 is introduced into the ladle 18 at the melt inlet 22 at a location near the bottom of the ladle 18 and exits near the top of the ladle 18 at the melt outlet 24. The melt outlet 24 has to be some distance below the melt surface 19t so that bubbles and surface oxide will not be sucked into the melt outlet 24. An ultrasonic radiator 30 is positioned at the bottom of the outer wall 20 of the refractory ladle 18.

Figures 2, 3:
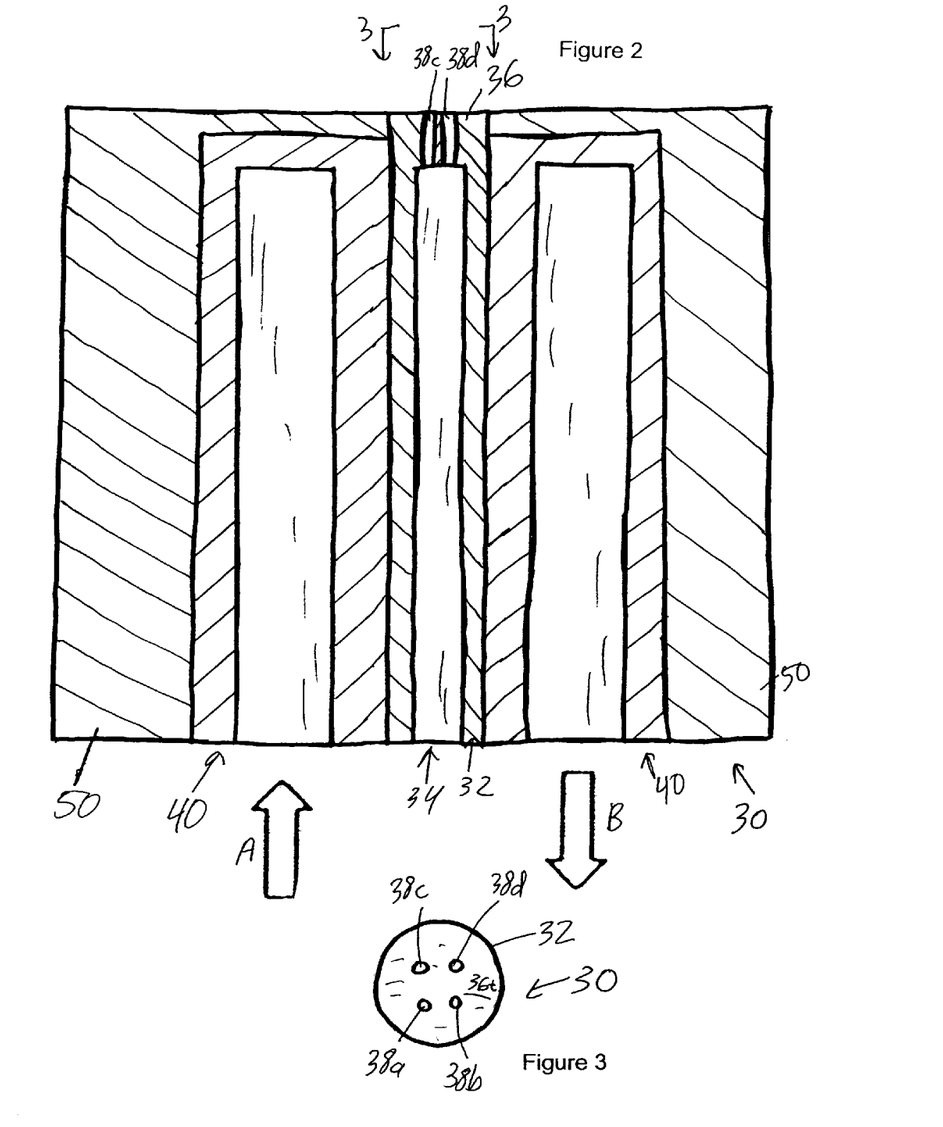
FIG. 2 is a cross-sectional detailed view of an apparatus (part of the radiator and the cooling jacket) according to the invention shown in FIG. 1.
FIG. 3 is a top plan view of the apparatus according to the invention taken along line 3-3 of FIG. 2.

Looking at FIGS. 2 and 3, the ultrasonic radiator 30 has a cylindrical outer wall 32 that defines a hollow cylindrical fluid flow path 34. A purge gas is introduced into the fluid flow path 34 of the radiator 30 from a purge gas source (not shown). The choice of purge gas will depend on the melt being degassed. Noble gases are often suitable for degassing, and other gases such as nitrogen or chlorine are often used for certain applications. The cylindrical outer wall 32 of the ultrasonic radiator 30 terminates in an end wall 36 that substantially closes off the fluid flow path 34 of the radiator 30. The cylindrical outer wall 32 and the end wall 36 form a hollow shell of the radiator 30. Throughholes 38a, 38b, 38c and 38d extend through the end wall 36 of the hollow ultrasonic radiator 30 to the outer surface 36t which contacts with the melt 19. Purging gas is introduced into the melt 19 from these throughholes 38a, 38b, 38c and 38d by way of the fluid flow path 34. While four throughholes are shown in FIG. 3, the invention is not limited to any specific number of throughholes. Also, the location of the throughholes is not limited to the end wall 36, e.g., the throughholes may be in the outer side wall 36, or any location on the hollow shell of the radiator 30. Preferably, the outer surface 36t of the end wall 36 of the radiator 30 is coated with a coating that prevents the top surface 36t of the radiator 30 from reacting or soldering with the molten metal melt 19. Typically, the radiator 30 is formed from a metallic or ceramic material.

Still looking at FIGS. 2 and 3, a cooling jacket 40 surrounds the ultrasonic radiator 30. The cooling jacket 40 is used to keep the ultrasonic radiator 30 at low temperatures. Coolant flows into the cooling jacket 40 in direction A of FIG. 2 and then flows out of the cooling jacket 40 in direction B of FIG. 2. Air is one example coolant for use in the cooling jacket 40 to cool the radiator 30. The cooling jacket 40 is protected using insulation materials 50 (shown in FIG. 2). The ultrasonic radiator/cooling jacket assembly, is preferably placed at the bottom of the outer wall 20 of the refractory ladle 18 as shown in FIG. 1.

In accordance with the present invention, vibration at an ultrasonic frequency is operably applied to the radiator 30. As is well known, ultrasound is a mechanical wave with a frequency at the top of or above the audible range that propagates by motion of particles within a medium. Preferably, the ultrasonic frequency is operably applied to the radiator 30 by an ultrasonic transducer that generates ultrasonic waves having a frequency of about 1000 Hz to about 2,000,000 Hz. Preferably, the frequency is in the range of 15 kHz to 25 kHz, and at an input power intensity in the range of 300 to 6000 watts, preferably in the range of 500 to 3000 watts.

The ultrasonic radiator/cooling jacket assembly shown in FIGS. 1-3 can be installed in a refractory ladle that connects a melting furnace and a casting machine. Purge gas bubbles (e.g., argon) introduced through throughholes 38a, 38b, 38c and 38d in the end wall 36 of the radiator 30 break up from large bubbles into small bubbles by ultrasonic vibrations. These small bubbles released at the throughholes 38a, 38b, 38c and 38d of the end wall 36 of the radiator 30 will then travel upwards in the melt 19, collecting the tiny cavitation bubbles induced by ultrasonic vibration as they travel upwards. Hydrogen (or other dissolved gases) in the melt 19 will then diffuse to the cavitation bubbles and the purge gas bubbles and escape at the top surface 19t of the melt 19. Since molten metal with dissolved gases is introduced at the bottom of the ladle 18 at melt inlet 22 and degassed molten metal is discharged at the top of the ladle 18 at melt outlet 24, the ultrasonic radiator 30 can be used for continuous degassing of molten metal for industrial applications.

Thus, the invention involves: (1) a radiator design that allows purge gas to be delivered through the radiator 30 to the melt 19 to break up the large purge gas bubbles into small bubbles, as well as to create a large number of tiny cavitation bubbles and acoustic streaming in the melt; (2) the use of a small amount of purge gas to create small bubbles (under the assistant of ultrasonic vibration) that collect those tiny cavitation bubbles and the dissolved hydrogen (i.e. making the cavitation bubble survive in the melt); (3) a cooling jacket 40 that keeps the major part of the radiator 30 at low temperatures, ensuring that the radiator 30 works and vibrates for extended time; (4) the placement of the radiator 30 at the bottom of the melt 19 thereby allowing the small bubbles released from the radiator 30 to travel upward throughout the melt 19; and (5) the design of the ladle 19 with melt inlet 22 and the radiator 30 near the bottom of the ladle 18, and the melt outlet 24 at locations close to the top of the ladle 18.

Alternative configurations of the invention are also possible. For example, multiple ultrasonic radiators 30 can be used in the ladle 18 for faster degassing, and the radiator 30 shown in FIGS. 1-3 can be placed on the side or top of the outer wall 20 of the ladle 18. The through holes 38a, 38b, 38c, and 38d can also be placed at the side wall of the radiator exposing to the melt if the end wall of the radiator is not flush with the cooling jacket. Also, the shape of the ladle 18 can be varied to make bubble distribution more uniform. In addition, ultrasonic vibration alone (without purging gas) can also be used for the degassing for shallow melt or melt of a small volume (a few kilograms).

In another version of the invention, degassing is improved by lowering the air pressure above the melt 19 by way of a means for lowering air pressure above the melt. A suitable air tight cover is provided over the ladle 18, and vacuum can be used at the top of the ladle 18 below the cover for fast degassing (gas removal), and ultrasonic vibrations can be used to assist the vacuum degassing. By vacuum, we mean a pressure below 760 torr. Preferably, the vacuum is below 200 torr, and most preferably, the vacuum is below 25 torr. The vacuum can be achieved and maintained by exhausting air above the ladle 18 with a vacuum pump.

In another version of the invention, degassing is improved by lowering the relative humidity above the melt 19 by way of a means for regulating humidity above the melt 19. For example, a suitable air tight cover is provided over the ladle 18, and air of a lower dew point can be obtained by compressing the atmosphere above the melt with a compressor and passing the compressed air through a dehumidifier. The dew point of the obtained air is thereby lowered. The portion above the surface of the melt 19 in the ladle 18 is rendered to be an atmosphere of air having a lower dew point than that of the surrounding atmosphere and is maintained at a lower humidity. A preferred relative humidity above the above the melt is 30% to 80%, and most preferably 40% to 60%.

The invention has many advantages, including without limitation: (1) fast degassing because small bubbles are generated creating large bubble/melt interfacial surface areas; (2) a significant reduction of the consumption of purge gas (argon or other gas) that is used for degassing; (3) less dross formation because the melt surface 19t is tranquil; (4) a clean process, that is, less emission, less dross formation, and preferably no use of chlorine; and (5) no moving parts compared with rotary degassing.

EXAMPLES

The following Examples have been presented in order to further illustrate the invention and are not intended to limit the invention in any way. For a small volume melt, no purge gas is needed because the cavitation bubbles can escape from the melt surface. All the following data were obtained without using any purge gas.

A. Experimental Apparatus and Methods

A study of ultrasonic degassing in an aluminum A356 alloy melt was performed. Aluminum alloy A356 typically contains 6.5-7.5% silicon, 0.2% max. iron, 0.2% max. copper, 0.1% max. manganese, 0.2-0.4% magnesium, 0.10 max. zinc, and 0.2% max. titanium. Typical applications of aluminum alloy A356 are airframe castings, machine parts, truck chassis parts, aircraft and missile components, and structural parts requiring high strength.

Figure 4:
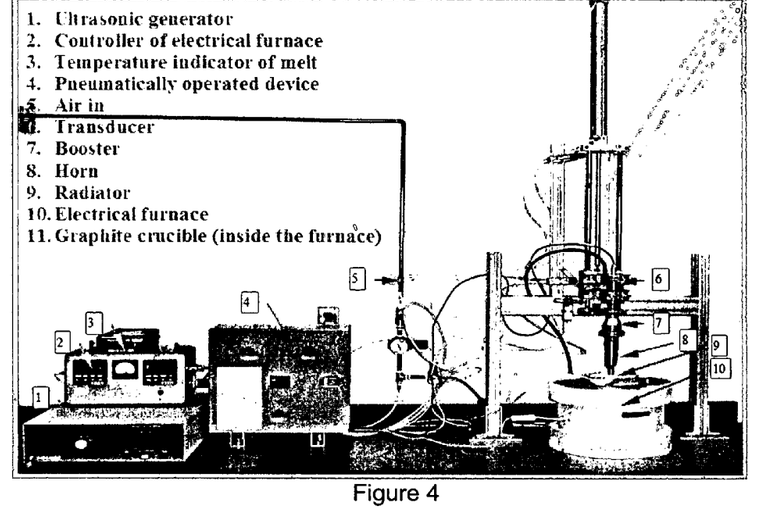
FIG. 4 shows an experimental apparatus used for the examples.

An experimental apparatus was constructed including an ultrasonic device which comprised: (i) an ultrasonic processor including a power supply, an air cooled transducer, a booster, a horn, and a radiator; and (ii) a heating unit including a furnace and a temperature controller. FIG. 4 shows the experimental apparatus which included an ultrasonic generator 1, a furnace controller 2, a temperature indicator 3 for the alloy melt, a pneumatically operated device 4, an air inlet line 5, a transducer 6, a booster 7, a horn 8, a radiator 9, an electric furnace 10, and a graphite crucible 11 inside the furnace 10. Samples were solidified in a vacuum unit set at 28 inches Hg (pressure: 50 torr).

Ultrasonic degassing was carried out in the aluminum A356 alloy melt under three conditions: (1) Humidity: the humidity was varied from 40% to 60%; (2) Temperature of the melt: four melt temperatures, 620° C., 660° C., 700° C. and 740° C. were tested; and (3) Volume/size of the melt or the size of crucible: the weight of the melt was 0.2 kg, 0.6 kg and 2 kg, respectively.

B. Results

Figure 5A:
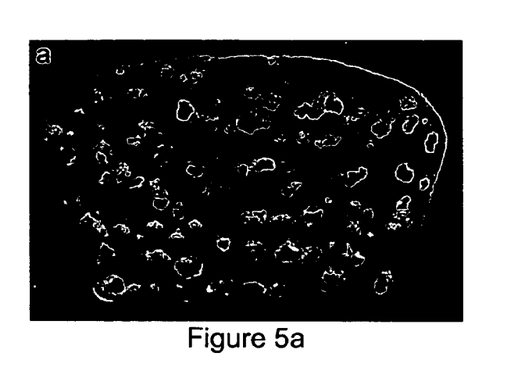
FIGS. 5a and 5b show micrographs of the porosity in solidified aluminum A356 specimens using alloy melts prepared at 740° C. under (a) a humidity of 60% in FIG. 5a, and (b) a humidity of 40% in FIG. 5b.
Figure 5B:
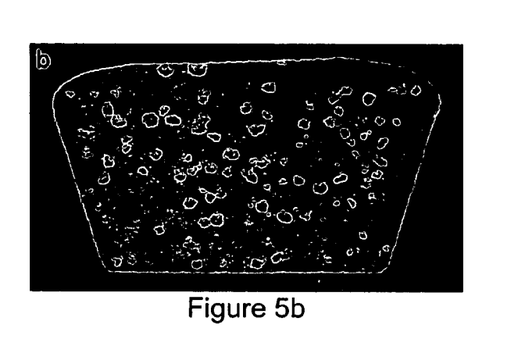
Figure 6:
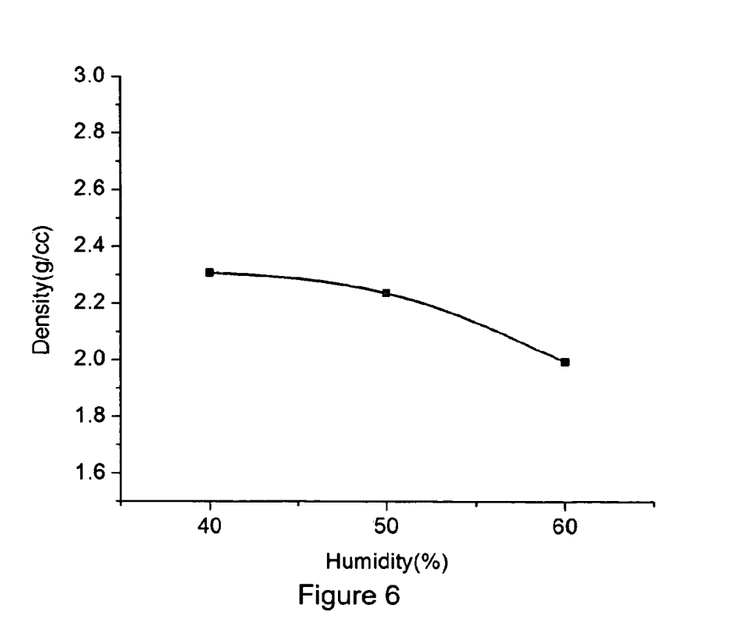
FIG. 6 is a graph showing the variation of densities for the solidified aluminum A356 specimens under different humidity levels.

FIGS. 5a, 5b and 6 show the effect of humidity on the solidified aluminum A356 alloy specimens. FIGS. 5a and 5b show micrographs of the porosity in solidified aluminum A356 specimens using alloy melts prepared at 740° C. under (a) a humidity of 60% in FIG. 5a, and (b) a humidity of 40% in FIG. 5b. FIG. 6 is a graph showing the variation of densities for the solidified aluminum A356 specimens under different humidity levels (40%, 50% and 60%).

Figure 7A:
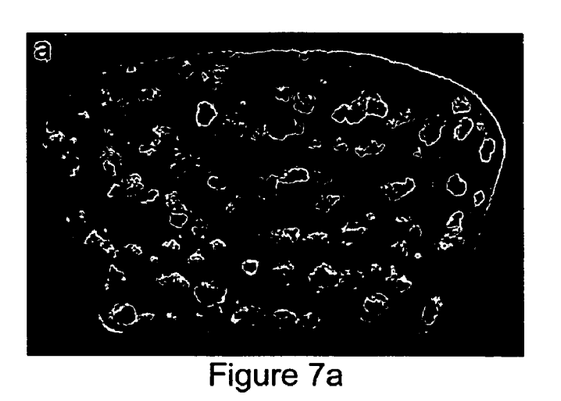
FIGS. 7a, 7b, 7c show micrographs of the porosity in solidified aluminum A356 specimens after 0 minutes (FIG. 7a), 1 minute (FIG. 7b), and 4 minutes (FIG. 7c) of ultrasonic vibration at 740° C. temperature and 60% humidity.
Figure 7B:
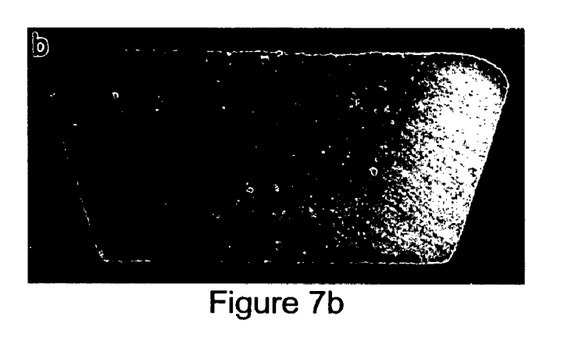
Figure 7C:
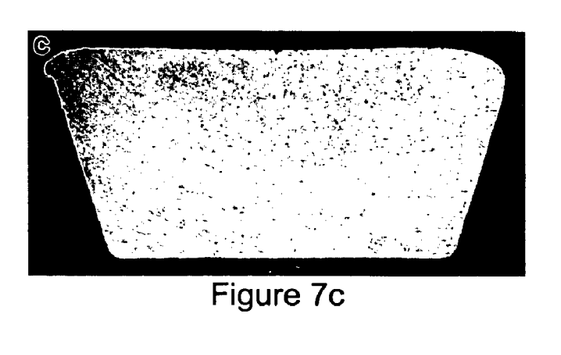
Figure 8:
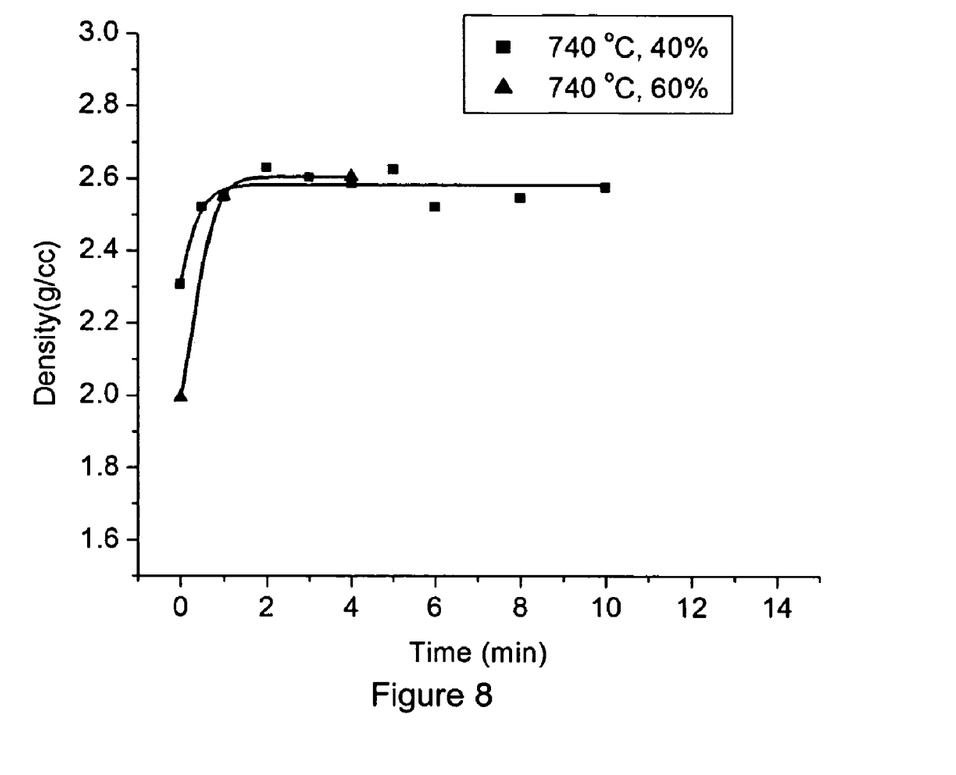
FIG. 8 is a graph showing the measured density of the solidified aluminum A356 specimens as a function of ultrasonic processing time in the melt of different initial hydrogen concentrations.

FIGS. 7a, 7b, 7c and 8 show that degassing can be achieved in a few minutes using ultrasonic vibration. FIGS. 7a, 7b, 7c show micrographs of the porosity in solidified aluminum A356 specimens after 0 minutes (FIG. 7a), 1 minute (FIG. 7b), and 4 minutes (FIG. 7c) of ultrasonic vibration at 740° C. temperature and 60% humidity. FIG. 8 is a graph showing the measured density of the solidified aluminum A356 specimens as a function of ultrasonic processing time in the melt of different initial hydrogen concentrations.

Figure 9:
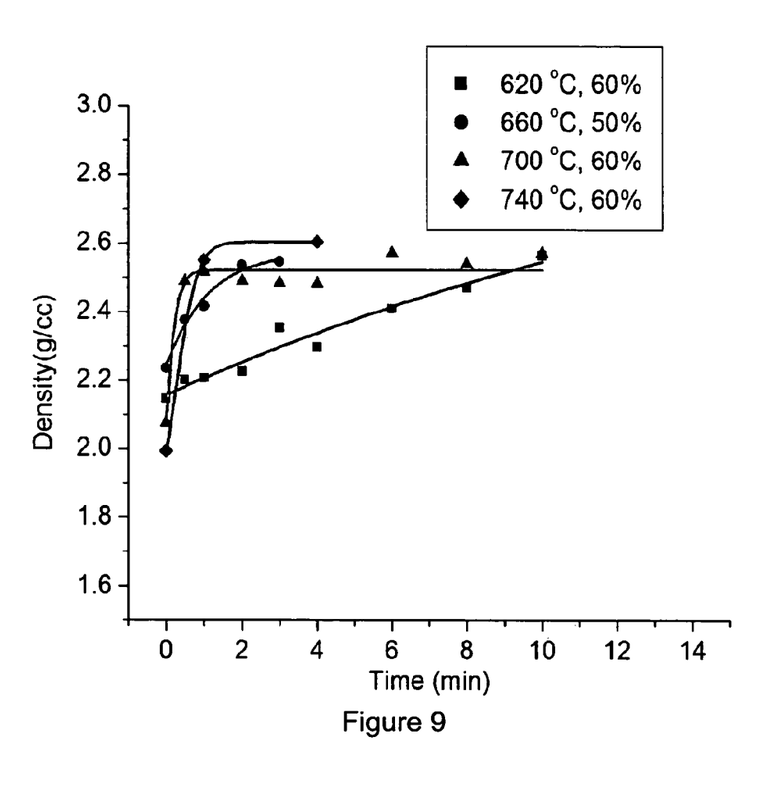
FIG. 9 is a graph showing the measured density of the solidified aluminum A356 specimens as a function of ultrasonic processing time in the alloy melt at different processing temperatures.

FIG. 9 shows that ultrasonic degassing is more efficient at temperatures higher than 700° C. FIG. 9 is a graph showing the measured density of the solidified aluminum A356 specimens as a function of ultrasonic processing time in the alloy melt at different processing temperatures.

Figure 10:
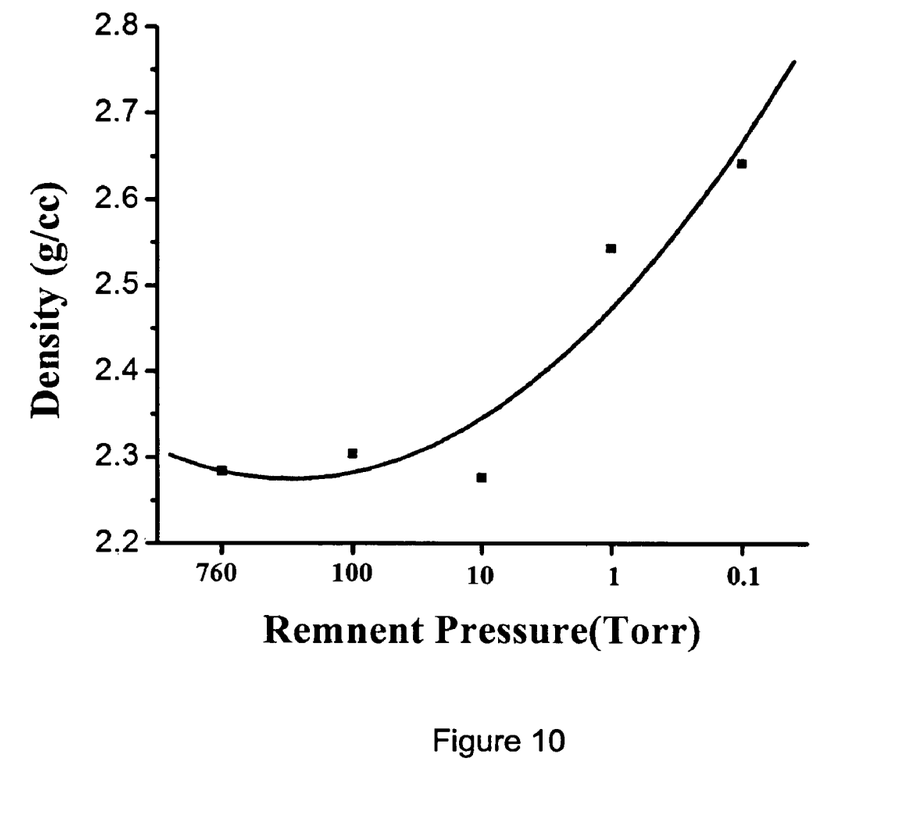
FIG. 10 is a graph showing the measured density of the solidified aluminum A356 specimens as a function of remnant pressure for vacuum degassing after 30 minutes of processing time.

FIG. 10 shows the effect of vacuum degassing. FIG. 10 is a graph showing the measured density of the solidified aluminum A356 specimens as a function of remnant pressure for vacuum degassing after 30 minutes of processing time.

Figure 11:
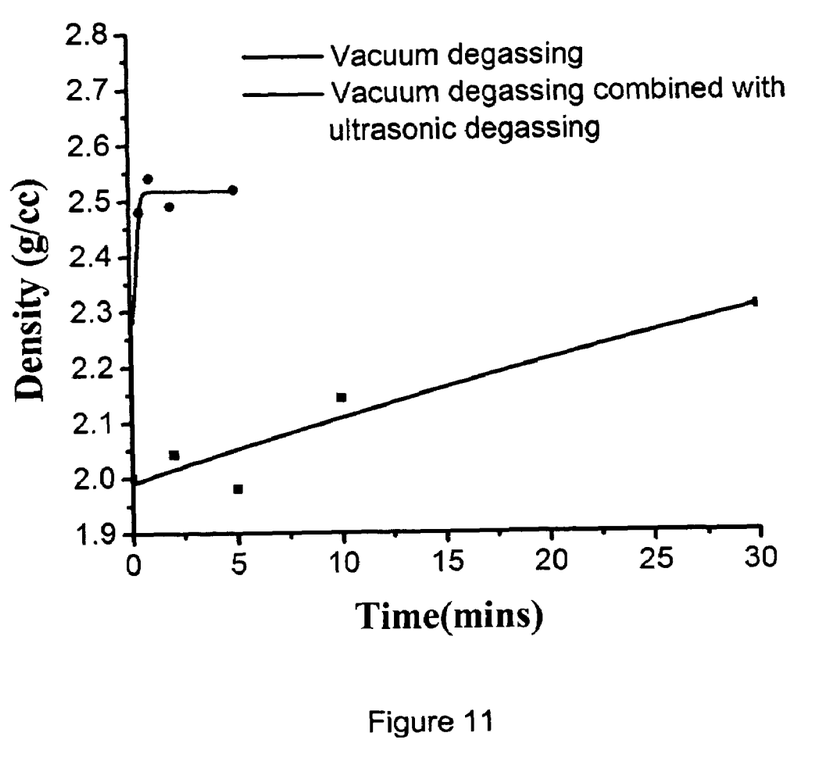
FIG. 11 is a graph showing the measured density of the solidified aluminum A356 specimens as a function of processing time for vacuum degassing combined with and without ultrasonic degassing under a remnant pressure of 100 torr.

FIG. 11 shows the effect of vacuum degassing under 100 torr with the assistance of ultrasonic vibrations. FIG. 11 is a graph showing the measured density of the solidified aluminum A356 specimens as a function of processing time for vacuum degassing combined with and without ultrasonic degassing under a remnant pressure of 100 Torr.

Figure 12:
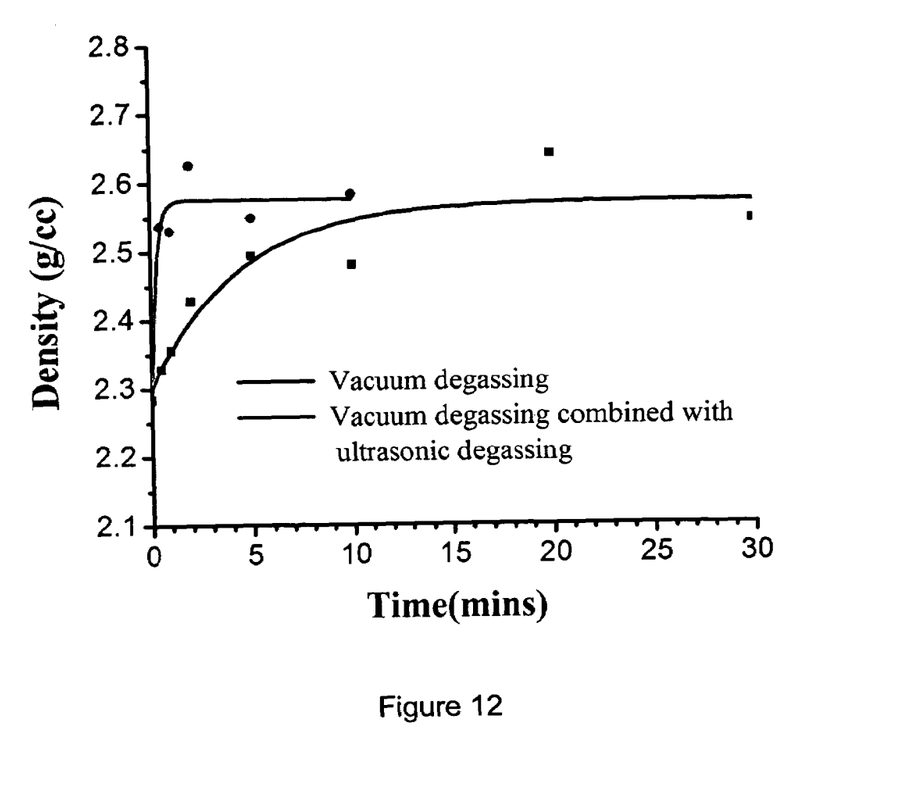
FIG. 12 is a graph showing the measured density of the solidified aluminum A356 specimens as a function of processing time for vacuum degassing combined with and without ultrasonic degassing under a remnant pressure of 1 torr.

FIG. 12 shows the effect of vacuum degassing under 1 torr with the assistance of ultrasonic vibrations. FIG. 12 is a graph showing the measured density of the solidified aluminum A356 specimens as a function of processing time for vacuum degassing combined with and without ultrasonic degassing under a remnant pressure of 1 Torr.

Thus, the invention provides a method and apparatus for removing impurities such as hydrogen from molten aluminum alloys or magnesium alloys. Among other things, the aluminum industry, metalcasting industry, and automotive industry can use this technology for fast and clean degassing.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An apparatus for degassing a liquid, the apparatus comprising:
   a container for the liquid, the container including an inlet and an outlet for the liquid, the outlet being positioned above the inlet;
   an ultrasonic transducer; and
   a radiator coupled to the ultrasonic transducer such that activation of the ultrasonic transducer creates ultrasonic vibration in the radiator,
   wherein the radiator has a hollow shell defining a fluid flow path for transporting a purge gas, the shell including at least one throughhole that extends from the fluid flow path to a top surface of the radiator, and
   wherein the radiator is positioned in a wall of the container such that the top surface of the radiator can contact liquid in the container, the top surface of the radiator being flush with an inner surface of the wall of the container, and
   wherein the liquid flows above the top surface of the radiator upward from the inlet to the outlet.

2. The apparatus of claim 1 wherein:
   the shell of the radiator comprises a cylindrical outer wall and an end wall extending inward from the outer wall, and
   a plurality of throughholes extend through the end wall from the fluid flow path to the top surface of the radiator.

3. The apparatus of claim 1 wherein:
   the container is a refractory ladle, or a holding furnace of molten metal or metal alloy, or a reservoir in a trough for transporting molten metal or metal alloy.

4. The apparatus of claim 1 further comprising:
   a cooling jacket surrounding the radiator for lowering the radiator temperature.

5. The apparatus of claim 1 wherein:
   the top surface of the end wall of the radiator has a coating that protects the top surface of the radiator from dissolving into liquid in the container.

6. The apparatus of claim 1 further comprising: means for lowering air pressure above liquid in the container.

7. The apparatus of claim 1 wherein:
   wherein the radiator is positioned in the wall of the container such that the top surface of the radiator is below liquid in the container.

8. The apparatus of claim 1 further comprising:
   means for regulating humidity above liquid in the container.

9. The apparatus of claim 1 further comprising:
   a source of the purge gas for introducing the purge gas into the fluid flow path of the radiator such that the purge gas is introduced into the radiator at a rate of 30 cubic feet per hour or less.

10. The apparatus of claim 1 wherein:
    bubbles of the purge gas released at the at least one throughhole travel upwards through the liquid which flows upward from the inlet above the top surface of the radiator and to the outlet.

* * * * *